2,580,687

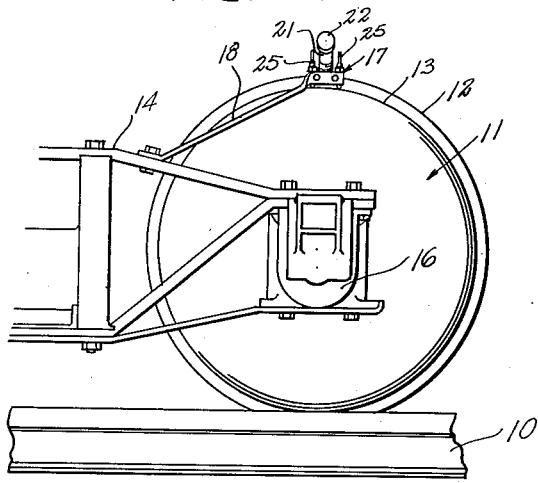
FIG. 1.
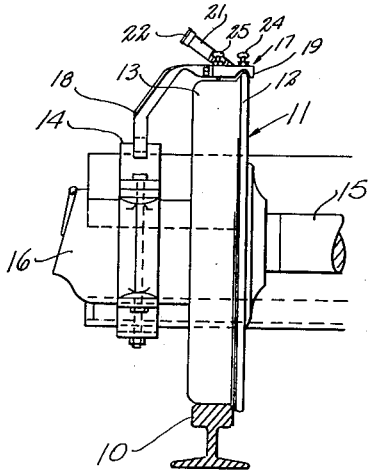
FIG. 2.
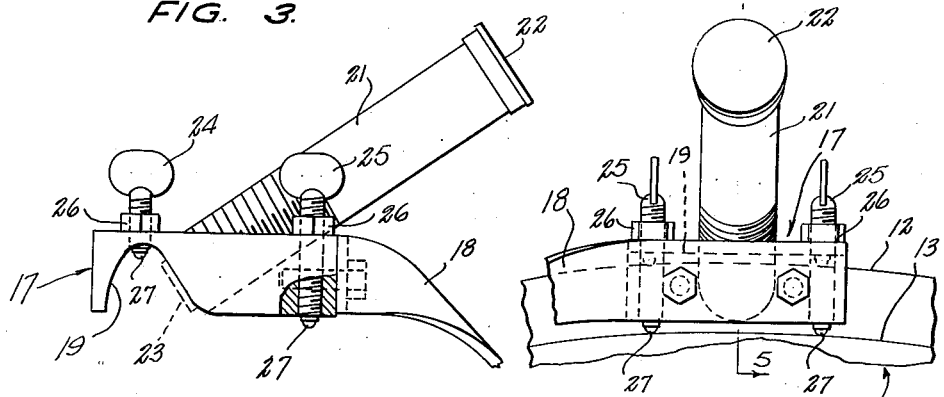
FIG. 3.
FIG. 4.
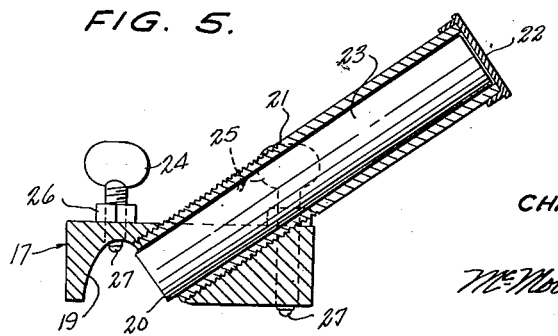
FIG. 5.
INVENTOR.
CHARLES E. McMILLAN, Patented Jan. 1, 1952

UNITED STATES PATENT OFFICE 2,580,687

MOUNT FOR CANDLESTICK LUBRICATORS FOR CAR AND LOCOMOTIVE WHEEL FLANGES

Charles E. McMillan, Alton, Ill.

Application March 25, 1949, Serial No. 83,384

4 Claims. (Cl. 184—3)

My invention relates to lubricators for the wheel flanges of flanged car or locomotive wheels, and more particularly to that type of lubricator which includes a "candlestick" of relatively hard lubricant which is adapted to be fed against the rail-engaging surface of the flange to maintain the same lubricated and prevent undue wear thereon.

With the foregoing in view, it is an object of my invention to provide an improved lubricator of the class described, and more particularly an improved mount for such a lubricator.

A further object is to provide an improved mount for a lubricator of the class described which includes anti-friction means supporting the mount on the wheel.

A further object is to provide an improved mount for a lubricator of the class described which includes anti-friction means riding both the car or locomotive wheel tread and the car or locomotive wheel flange, and which anti-friction means are adjustable to vary the spacing and angular relation of the lubricator relative to the flange.

Other objects and advantages reside in the particular structure of the invention, combination and arrangement of the several parts, and will be readily understood by those skilled in the art upon reference to the attached drawing in connection with the following specification, wherein the invention is shown, described and claimed.

In the drawing:

Figure 1 is an elevational view of a car wheel showing the lubricator according to the invention applied thereto;

Figure 2 is an end elevation thereof;

Figure 3 is an end elevation on an enlarged scale of the mount for the lubricator apart from the rest of the structure;

Figure 4 is a rear view thereof looking from the right of Figure 3;

Figure 5 is a transverse vertical sectional view taken substantially on the plane of the line 5—5 of Figure 4.

Referring specifically to the drawing, wherein like reference characters have been used throughout the several views to designate like parts, and referring at first to Figures 1 and 2, 10 indicates a suitable rail for a car wheel 11 of well known form. The wheel 11 includes a tread 13 adapted to ride atop the rail 10 and a flange 12 having an inner surface adapted to bear at times against an edge surface of the rail 10 in a well known manner. The wheel 11 is supported by any suitable and/or well known type of truck 14 which includes wheel axles 15 and journal boxes 16. As so far described, the structure is conventional and forms no part of my invention.

The mount according to the invention comprises a base or mount generally indicated at 17 which is supported on the truck 14 by any suitable bracket 18. In the embodiment illustrated, the base 17 comprises a rectangular plate having an under surface formed to be substantially complementary to the profile of the car wheel tread 13 and flange 12. Thus, the under surface of the base 17 is formed with a longitudinally-extending groove 19 substantially complementary to the tread flange 12 and receiving such flange therein. Also, the plate is formed with a diagonally-downwardly-directed opening 20 therethrough which is interiorly threaded and which is directed toward the working surface of the flange 12 in angular intersecting relation thereto. A tubular magazine 21 is threaded into the opening 20. The magazine 21 is open at both ends and the rear end may be closed by a closure cap 22 whereby a stick of hard flange lubricant 23 may be readily applied to the magazine. As is readily apparent in Figure 5, the lubricant stick 23 feeds by gravity downwardly into engagement with the working surface of the flange 12, whereby to lubricate the same as the wheel 11 revolves.

To maintain the base 17 in spaced relation to the wheel tread and flange, anti-friction supports for the same have been provided. In the embodiment illustrated, such supports comprise relatively short thumb screws 24 and relatively longer thumb screws 25. Such thumb screws 24 and 25 are threaded through the base 17 and include lower ends extending below the under surface of the base. Thus, the anti-friction bearing elements or short thumb screws 24 are longitudinally aligned and extend through the floor of the groove 19, while the second antifriction bearing elements or the longer thumb screws 25 extend through the under surface proper of the base 17, and such thumb screws 25 are likewise longitudinally aligned. Also, the lower ends of both of the thumb screws of each set are formed with bearing seats mounting anti-friction ball bearings 27. The bearings 27 for the shorter screws 24 ride on the outer edge of the flange 12, while the bearings 27 for the longer screws 25 ride on the tread of the wheel 11. In the embodiment illustrated, the screws 24 and 25 are locked in adjusted positions by lock nuts 26. Thus, when it is desired to adjust the spacing of the base 17 from the wheel flange or tread, the lock nuts 26 are loosened and the screws 24 and 25 suitably adjusted. The lock nuts 26 are thereafter retightened.

Also, the lock nuts 26 provide means whereby the bolts 24 and 25 are individually adjustable to vary the angular relationship of the magazine 21 and lubricant stick 23 relative to the flange 12.

While the device is shown applied to a car wheel, it is equally, or even better, adapted for use in locomotive wheels, particularly the large driving wheels. Thus, the term "car wheels," as used herein is understood to include locomotive wheels as well as car wheels per se.

Moreover, while I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. A car wheel lubricator comprising a mount adapted to be fixedly positioned above and adjacent to a flanged car wheel, said mount being provided with a longitudinally extending groove on its under surface thereof adjacent one end thereof and adapted to embrace the flange of the car wheel, an open ended tubular magazine having one end extending through said mount and in communication with said groove and fixedly supported in said mount for holding a stick of lubricant, the other open end of said magazine projecting above and terminating at a point spaced from said mount, a closure cap closing the other open end of said magazine, and an anti-friction bearing element positioned in said groove adjacent its top and fixedly supported in said mount and adapted to engage the adjacent portion of the wheel flange.

2. A car wheel lubricator comprising a mount adapted to be fixedly positioned above and adjacent to a flanged car wheel, said mount being provided with a longitudinally extending groove on its under surface thereof adjacent one end thereof and adapted to embrace the flange of the car wheel, an open ended tubular magazine having one end extending through said mount and in communication with said groove and fixedly supported in said mount for holding a stick of lubricant, the other open end of said magazine projecting above and terminating at a point spaced from said mount, a closure cap closing the other open end of said magazine, and an anti-friction bearing element depending from the under surface of said mount adjacent to and spaced from its other end and from said groove and fixedly supported in said mount and adapted to engage the adjacent portion of the tread of said car wheel.

3. A car wheel lubricator comprising a mount adapted to be fixedly positioned above and adjacent to a flanged car wheel, said mount being provided with a longitudinally extending groove on its under surface thereof adjacent one end thereof and adapted to embrace the flange of the car wheel, an open ended tubular magazine having one end extending through said mount and in communication with said groove and fixedly supported in said mount for holding a stick of lubricant, the other open end of said magazine projecting above and terminating at a point spaced from said mount, a closure cap closing the other open end of said magazine, a screw extending through and in threaded engagement with said mount and having one end depending from the top of said groove, and an anti-friction ball bearing on the projecting end of said screw and adapted to engage the adjacent portion of the wheel flange.

4. A car wheel lubricator comprising a mount adapted to be fixedly positioned above and adjacent to a flanged car wheel, said mount being provided with a longitudinally extending groove on its under surface thereof adjacent one end thereof and adapted to embrace the flange of the car wheel, an open ended tubular magazine having one end extending through said mount and in communication with said groove and fixedly supported in said mount for holding a stick of lubricant, the other open end of said magazine projecting above and terminating at a point spaced from said mount, a closure cap closing the other open end of said magazine, an anti-friction bearing element positioned in said groove adjacent its top and fixedly supported in said mount and adapted to engage the adjacent portion of the wheel flange, and a second antifriction bearing element depending from the under surface of said mount adjacent to and spaced from its other end and from said groove and fixedly supported in said mount and adapted to engage the adjacent portion of the tread of said car wheel, each of said anti-friction bearing elements embodying a screw extending through and in threaded engagement with said mount and having one end depending from said mount, and an anti-friction ball bearing on the projecting end of each screw.

CHARLES E. McMILLAN.

REFERENCES CITED

The following references are of record in the file of this patent:

UNITED STATES PATENTS

| Number | Name | Date |
|---|---|---|
| 997,446 | Gerlinger | July 11, 1911 |
| 1,177,632 | Johnson | Apr. 4, 1916 |
| 2,106,665 | Skinner | Jan. 25, 1938 |